(12) United States Patent
Agevik et al.

(10) Patent No.: US 7,422,379 B2
(45) Date of Patent: Sep. 9, 2008

(54) STAND FOR A CAMERA DEVICE

(75) Inventors: Markus Agevik, Malmo (SE); Anders Lundquist, Malmo (SE)

(73) Assignee: Sony Ericsson Mobile Communications AB (SE)

( * ) Notice: Subject to any disclaimer, the term of this patent is extended or adjusted under 35 U.S.C. 154(b) by 248 days.

(21) Appl. No.: 11/289,716

(22) Filed: Nov. 29, 2005

(65) Prior Publication Data
US 2007/0122141 A1  May 31, 2007

(51) Int. Cl.
G03B 17/00 (2006.01)
G03B 17/08 (2006.01)
H04N 5/225 (2006.01)
B65D 85/38 (2006.01)

(52) U.S. Cl. ............... 396/424; 396/27; 396/29; 396/425; 396/428; 348/376; 206/316.2; 455/575.3; 455/575.8

(58) Field of Classification Search ............ 396/419, 396/424, 425, 428, 27, 29, 25; 348/373, 348/375, 376; 206/316.1, 316.2; 455/575.1, 455/575.3, 575.8
See application file for complete search history.

(56) References Cited

U.S. PATENT DOCUMENTS 3,291,179 A * 12/1966 Lang ..................... 206/316.2
6,571,056 B2 * 5/2003 Shimamura et al. ........ 396/27
2006/0091268 A1 * 5/2006 Lee ..................... 248/187.1

FOREIGN PATENT DOCUMENTS

| JP | 8-211464 A | 8/1996 |
|----|------------|--------|
| JP | 9-83622 A | 3/1997 |
| JP | 10010641 A | 1/1998 |
| JP | 2005275079 A | 10/2005 |

OTHER PUBLICATIONS

International Search Report and Written Opinion for PCT/EP2006/011162; date of mailing Mar. 20, 2007.

* cited by examiner

*Primary Examiner*—Rochelle-Ann Blackman
(74) *Attorney, Agent, or Firm*—Myers Bigel Sibley & Sajovec, P.A.

(57) ABSTRACT

A stand for a camera device, the stand comprising an attachment element which is detachably fastened to the camera device and at least one support element which is displaceably connected to the attachment element. The support element is displaceable between at least two positions, a "storage" position where the at least one support element essentially lies up against an outer surface of the camera device and an "active" position where the at least one support element is displaced away from the outer surface of the camera device in order to provide a support for supporting the camera device in a steady orientation on a surface. The attachment element and the supporting element are furthermore arranged such that the attachment element remains fastened to the camera device during the displacement of the supporting element between its storage position and its active position. In this way, a stand is provided which may be very easy and convenient for the user to use.

14 Claims, 5 Drawing Sheets

STAND FOR A CAMERA DEVICE

FIELD OF THE INVENTION

The present invention relates to stands that may be used to support a camera device.

BACKGROUND

Many different types of stands are presently available to support camera devices, such as digital and analog cameras and video and still picture cameras. In response to the release of mobile telephones with built in cameras, stands have also been adapted for use with mobile telephones. Accordingly, the term "camera device" as used herein includes any device which has picture or video taking capabilities.

An exemplary stand for use with a mobile telephone is disclosed in U.S. 2005/0164541 A1. The stand disclosed by U.S. 2005/0164541 A1 is however a rather bulky stand which is attached to the phone via a quick connect coupling. This requires the user to constantly carry around the bulky stand. Furthermore, when the user wishes to use the stand, the stand must first be attached to the phone.

Another example is disclosed by TW252039 Y. The stand disclosed by TW252039 Y is formed as a part of the back side of the housing of a mobile phone. In this way, the stand is always connected to the phone and therefore always available for use. However, the stand adds extra weight and volume to the phone which will be undesirable for those users who do not need a camera stand.

Still a further example is disclosed by U.S. 2002/0017545 A1. U.S. 2002/0017545 A1 discloses a carrying case for an electronic device. The carrying case can furthermore be transformed into a stand for holding the electronic device in a fixed position. In one embodiment, the case is used for carrying a camera. The case comprises a flexible metal portion which can be folded out to form a camera stand. The camera can then be taken out of the case and mounted onto the constructed camera stand. However, when converting the case to a camera stand, it is necessary to remove the camera from the case and then afterwards mount the camera on the stand with a fastening screw. This operation consumes time and the user can also risk loosing the screw which connects the camera to the stand. In addition, the case is rather bulky and heavy.

SUMMARY

It is therefore a first aspect of some embodiments of the current invention to provide a stand which can be attached directly to a camera device and which may be convenient and easy for the user to use.

This aspect may be provided for by the current invention in part in that the attachment element and the supporting element are arranged such that the attachment element remains fastened to the camera device during the displacement of the supporting element between its storage position and its active position. In this way, the user can easily transform the stand from its active position to its storage position and vice versa, without being required to attach or detach the camera device from the stand.

The at least one support element can be formed such that in the "storage" position of the at least one support element, the at least one support element at least partially covers the camera device. In this way, the camera device can be protected from damage since the at least one support element forms a sort of cover for the camera device.

Furthermore, the at least one support element could be formed as a thin sheet-like element. In this way, when the at least one support element is folded into the camera device in the storage position, the at least one support element does not significantly increase the volume of the camera device. This allows the user of the device to easily carry around the stand with the camera device fastened thereto. Furthermore, it should be mentioned that by thin sheet-like element is meant an object which has a thickness which is significantly less than the thickness of the camera device. Furthermore it should be mentioned that most of the currently available camera devices are rectangular, however in the future camera devices could be curved in which case the thin sheet like element could also be curved such that it adapts to the contours of the camera device.

In one embodiment, the stand could comprise at least two support elements which in their "storage" position completely cover the camera device. In a further embodiment, the stand could further comprise sealing means arranged between the at least one supporting element and/or the attachment element when the at least one supporting element is in the storage position. In this way the stand forms a waterproof housing around the camera device. The stand also protects the camera device very well in this embodiment since the camera device is completely enclosed within the stand. In this situation, the stand also forms a sort of protective case for the camera device. The stand could therefore be called a protective case which is also a stand.

The stand could further comprise an adjustment mechanism to adjust the orientation of the camera device in the "active" position of the at least one support element. In this way, the orientation of the camera device can easily be adjusted in order to put the camera in a certain desired orientation. This is especially useful when the underlying surface on which the stand is placed is uneven.

In order to provide a more stable support, the at least one support element could be formed such that at least three support points are provided between the support element and the underlying surface when the at least one support element is in its active position.

In another embodiment, the at least one support element could be rotatably attached to the attachment element via at least one hinge and the axis of the at least one hinge could be arranged parallel with or tangent to at least one of the sides of the camera device. In this way, the mechanism of the stand is simple and robust. It also provides a mechanism which in a simple way allows the support elements to be folded up against a surface of the camera device.

In still a further embodiment, the stand could comprises at least two support elements where one of said at least two support elements covers at least a portion of the "front" of the camera device and the other of said at least two support elements covers at least a portion of the "back" of the camera device when the at least two support elements are in the storage position. This embodiment ensures that both the front and the back of the camera device are protected. This is important since the majority of the fragile components of the camera device, for example the camera lens and the display, are typically located on the back and the front respectively of the camera device.

Since the main interface components of the camera device, for example screen, keypad, lens, etc are located on the front and the back of the camera device, in a preferred embodiment of the stand, the attachment element could be attached to the camera device by clamping onto two opposing "sides". The term "sides" refers to the sides of the camera device which are not the front or the back.

In order to protect the camera device even more while still allowing access to the buttons of the device, at least one of the at least one support elements could comprise a flexible section, such as a flexible transparent membrane, which allows the buttons of the camera device to be activated through the flexible section.

In more advanced embodiments of the stand, the stand could further comprise at least one other accessory, for example a lens, a screen, a flash, etc. A power source for powering the at least one other accessory could also be incorporated into the stand. The stand could also comprise a connection element for connecting the stand to other objects. For example, in some examples the stand could be provided with a clip for connecting the stand to the handle bars of a bicycle. In another example, the stand could comprise a threaded nut which is connectable to an ordinary tripod.

The stand could, in an embodiment, be attached to an interface socket of the camera device. For example, in the case where the camera device is a mobile phone, the stand could be fasted to the serial port which is typically located on the bottom of the phone. In the case where there is no serial port available, the socket for the power connection could be used instead. Using an interface socket for connecting the stand to the camera device will provide a very positive connection between the camera device and the stand, without it being necessary to have complex fastening means. The stand could furthermore be provided with its own interface socket which is electrically connected to the interface socket of the camera device. In this way, an accessory for the camera device can be connected to the camera device via the interface socket on the stand.

As mentioned previously, according to an embodiment, the camera device could be a mobile telephone with a built-in camera. In another embodiment, the camera device could be a normal camera.

In the case that the camera device is a normal camera, the attachment element could attach to the tripod attachment nut in the housing of the camera. A tripod attachment nut is standard on most camera devices and is of a standard size.

BRIEF DESCRIPTION OF THE DRAWINGS

The invention will now be described in greater detail with reference to the attached figures. It should be mentioned that the figures show example embodiments only and should therefore not be used to limit the scope of the current invention.

DETAILED DESCRIPTION OF THE EMBODIMENTS

Figure 1:
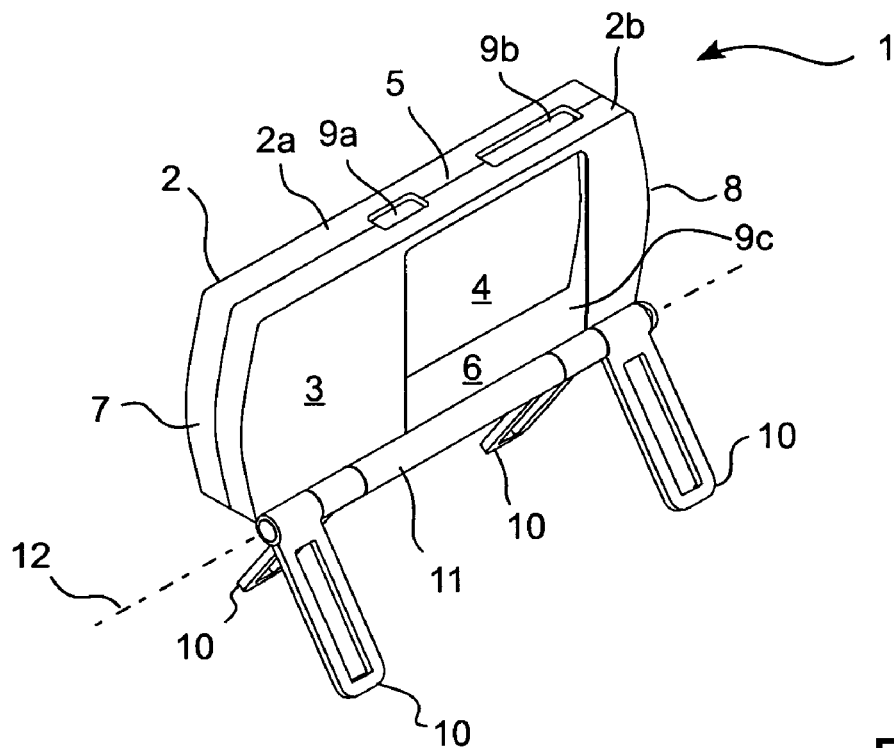
FIG. 1 shows a perspective view of a first embodiment of a stand according to the invention.

FIG. 1 shows a first embodiment 1 of a stand according to the invention. The first embodiment 1 is designed for a mobile telephone equipped with a camera. However a very similar stand could be used for an ordinary camera of similar dimensions with only small modifications to the stand 1. The stand 1 comprises a housing 2 which surrounds the mobile phone (not shown). The housing 2 is formed from two halves 2a, 2b which are snapped together around the mobile phone. The housing 2 has a front 3, a back 4, a left side 5, a right side 6, a top side 7 and a bottom side 8. The left side and the front have openings 9a,9b,9c covered by a flexible transparent membrane (not shown). The flexible transparent membrane allows the buttons of the mobile phone to be operated by the user through the membrane while still providing protection to the mobile phone. The housing 2 can therefore be made waterproof.

The stand 1 further comprises four support elements 10. The support elements 10 are formed as thin sheet-like elements rotatably connected to the housing 2 via a hinge 11. The axis 12 of the hinge 11 is arranged near the edge of the housing 2 between the front 3 and the right side 6. The hinge 11 and the axis 12 are also arranged parallel to the right side 6. In this way, the support elements 10 can be rotated into a "storage" position where they lie up against the front side 3 of the mobile phone. Due to the thin sheet-like nature of the support elements 10, the support elements 10 do not protrude very much past the housing 2 when they are in their storage position. In this way, the volume of the stand when connected to the phone is not significantly greater than the phone alone. The stand when connected to the phone can therefore easily be carried in a pocket for example.

It should be mentioned that the housing 2 serves as a sort of attachment element whereby the support elements 10 of the stand are connected to the mobile phone. The housing 2 can be detached from the mobile phone by splitting the housing 2 into its two halves 2a,2b and removing the phone.

FIG. 1 shows the stand 1 in its "active" position. In this position, the four support elements 10 are folded out, away from the mobile phone. In the active position, the stand provides a stable support for holding the mobile phone in a steady orientation on a surface. When the mobile phone is held in a steady orientation, it is possible to take pictures via a self timer or to take pictures at night when a slow shutter speed is required. The support elements 10 are also independently adjustable which allows the orientation of the phone to be accurately adjusted. Note that there is a certain amount of friction in the hinge 11. In this way, the support elements 10 can hold their position in the active position and therefore support the mobile phone securely. The amount of friction is chosen such that the user can easily displace the support elements 10, while the support elements 10 will maintain their position under the load of the mobile phone.

Furthermore, as should be obvious from FIG. 1, the stand can be moved between its active position and its storage position without needing to remove the mobile phone from the housing 2. The user just folds up or folds down the support elements 10. Therefore, the stand 1 is very easy and convenient to use.

Figure 2:
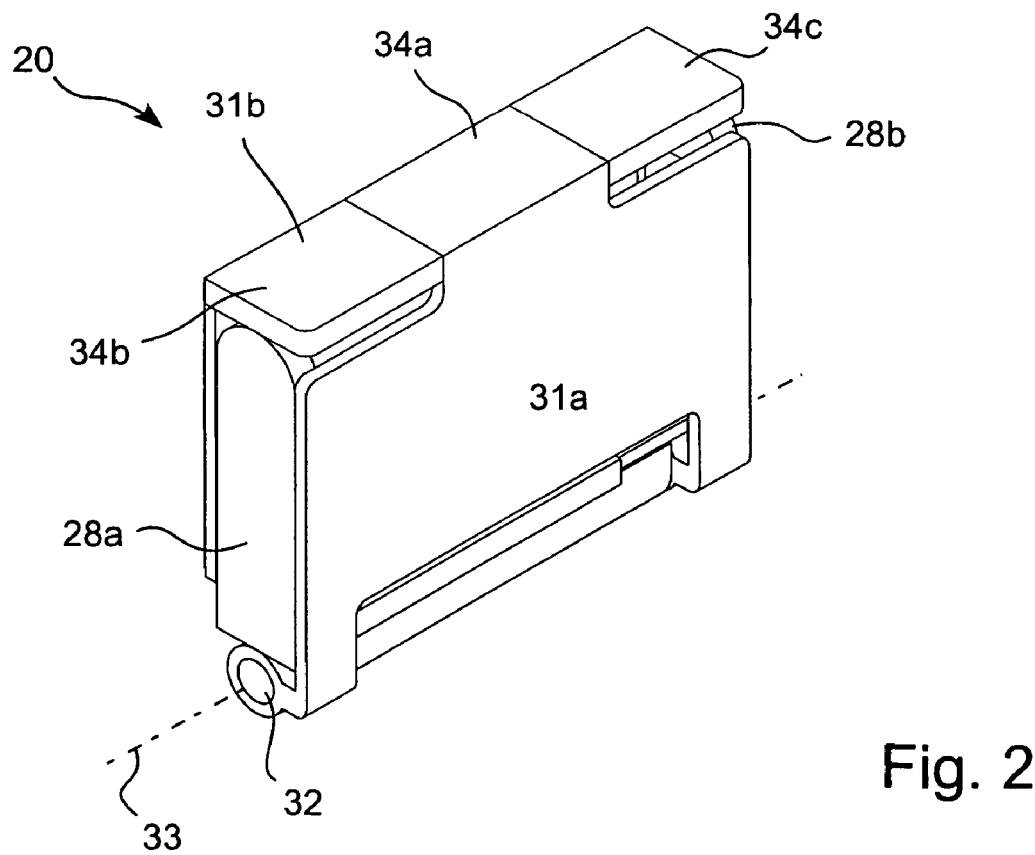
FIG. 2 shows a perspective view of a second embodiment of a stand according to the invention in a storage position.
Figure 3:
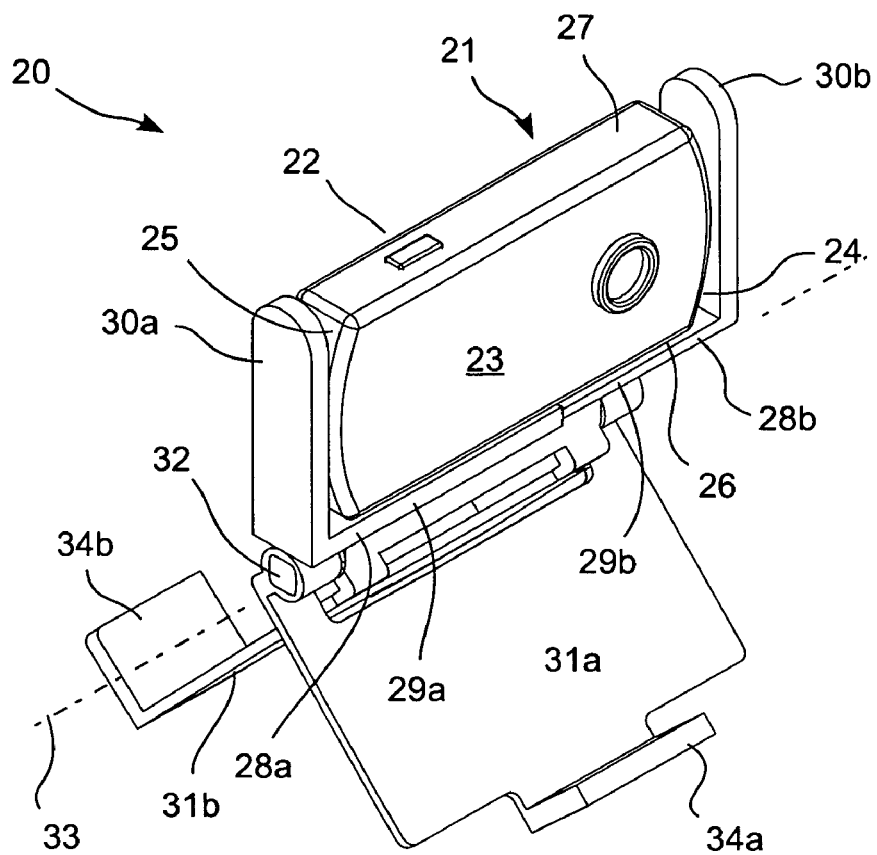
FIG. 3 shows a perspective view of the embodiment of FIG. 2 in an active position.

FIGS. 2 and 3 show a second embodiment 20 of a stand according to the current invention. As with the previous embodiment, this embodiment is also used for a mobile phone 21 with a built in camera. The mobile phone 21 has a front 22, a back 23, a top 24, a bottom 25, a left side 26 and a right side 27. The stand 20 comprises an attachment element 28 which comprises a first portion 28a and a second portion 28b. The first and second portion 28a,28b are both L-shaped brackets. The L-shape brackets have a long part 29a,29b and a base part 30a,30b. The L-shaped brackets are slideably connected to each other along the long parts of the L 29a,29b. The base parts 30a,30b are in contact with the bottom 25 and the top 24 of the mobile phone. By pressing the two base parts 30a, 30b of the attachment element 28 together, the attachment element 28 clamps onto the top and bottom sides of the mobile phone thereby holding the mobile phone 21 and the attachment element 28 securely together.

The base parts 30a, 30b of the attachment element 28 can advantageously be provided with friction enhanced surfaces such as rubber which more securely hold onto the mobile phone 21. Due to the slideable interface between the two portions 28a,28b of the attachment element 28, the attachment element can be attached to mobile phones of different dimensions. This makes the device more generic.

For stands which will be used with mobile phones equipped with an interface socket on the bottom 25 of the phone, the attachment element 28 can be equipped with a connection plug (not shown) arranged on the base part 30a of the first portion 28a of the attachment element 28. In this way, the connection socket of the mobile phone can first be connected with the connection plug of the attachment element 28. The attachment element 28 can then be squeezed shut. In this way, the mobile phone is securely held in place both by the positive connection between the connection plug of the attachment element and the connection socket of the mobile phone.

The stand 20 further comprises two support elements 31a, 31b. The support elements 31 are rotatably connected to the attachment element 28 via a hinge 32. The axis 33 of the hinge 32 is arranged along and parallel to the left side 26 of the mobile phone 21. The support elements 31 are again formed as thin sheet like elements.

In their storage position (FIG. 2), the support elements 31a,31b are rotated in towards the mobile phone 21 and lie up against the back 23 and the front 22 of the mobile phone respectively. In this embodiment, the support elements 31 are sized to completely cover the front 22 and back 23 of the mobile phone 21 in the storage position of the support elements 31. In this way, the mobile phone is well protected in the storage position of the support elements 31. Furthermore, due to the thin sheet-like form of the support elements 31, the stand does not occupy very much space when the support elements 31 are in their storage position. This makes the stand when connected to the mobile phone easy to carry.

In their active position (FIG. 3), the support elements 31a, 31b are rotated away from the mobile phone 21 until they form an angle of approximately 135 degrees to respectively the back 23 and the front 22 of the mobile phone 21. In this position, the support elements 31a,31b hold the mobile phone 21 in a steady orientation on an underlying surface. As with the previous embodiment 1, there is a slight amount of friction in the hinge 32 in order to hold the support elements 31 in position.

As can be seen from FIGS. 2 and 3, the first support element 31a has a single support point 34a and the second support element 31b has two support points 34b,34c. Due to the three support points 34a,34b,34c, the stand 20 can attain a steady orientation, even on uneven surfaces and even though there are only two support elements 31a,31b.

Figure 4:
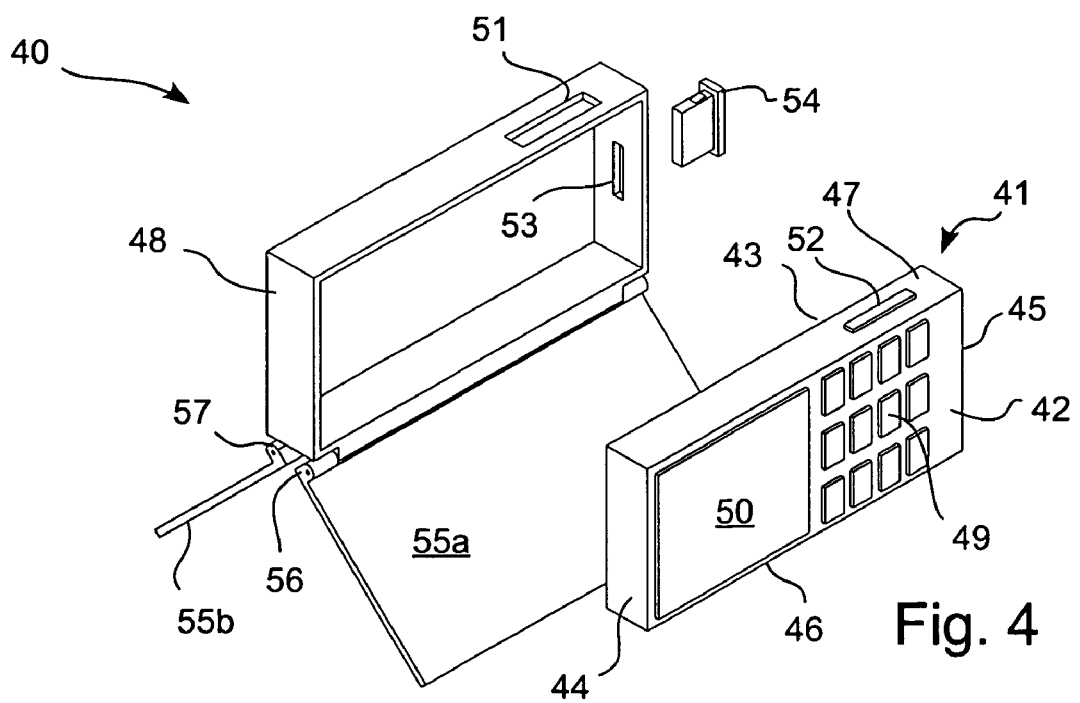
FIG. 4 shows an exploded perspective view of a third embodiment of a stand according to the invention.
Figure 5:
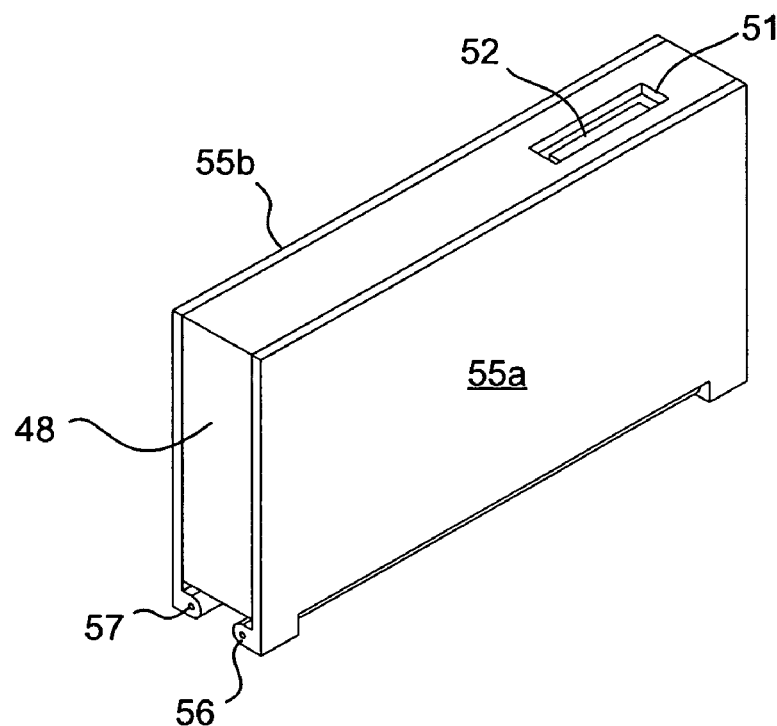
FIG. 5 shows a perspective view of the embodiment of FIG. 4 in a storage position.
Figure 6:
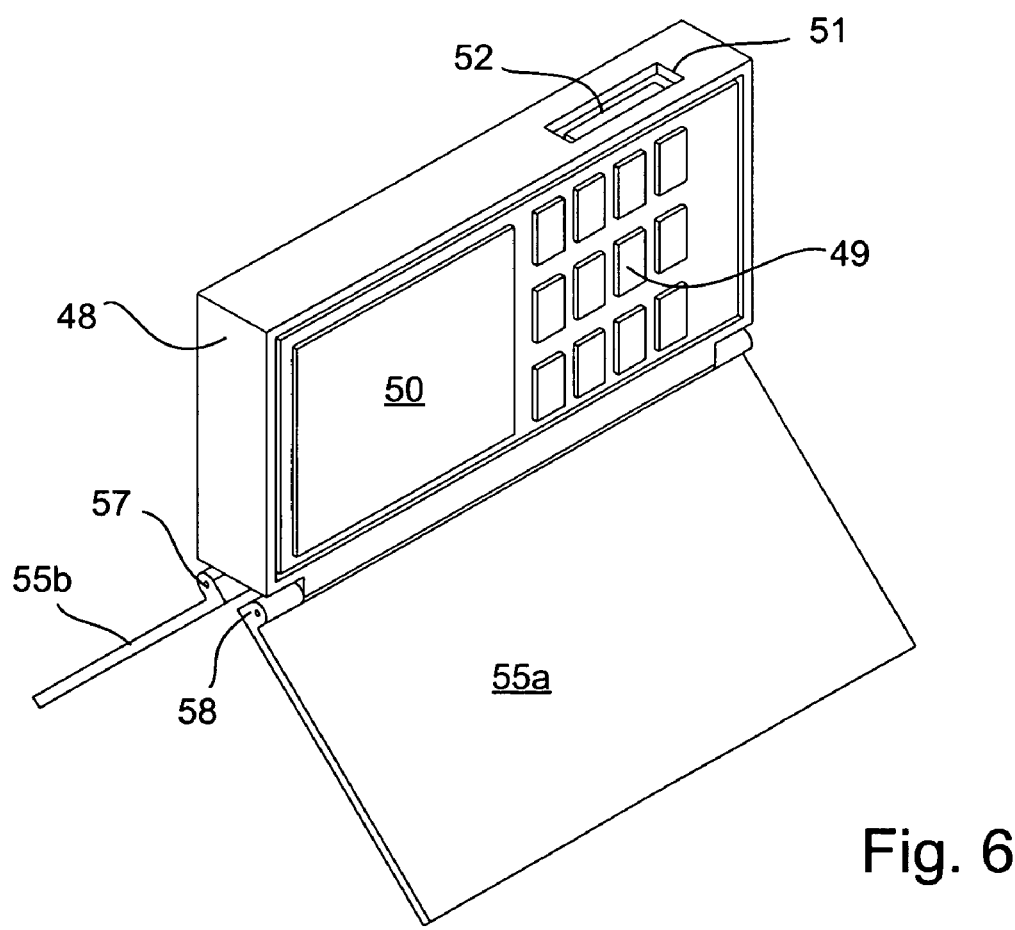
FIG. 6 shows a perspective view of the embodiment of FIG. 4 in an active position.

FIGS. 4-6 show a third embodiment 40 of a stand for a mobile phone 41. The mobile phone 41 has a front 42, a back 43, a top side 44, a bottom side 45, a left side 46 and a right side 47. The stand 40 comprises a frame 48 which completely surrounds the sides 44,45,46,47 of the phone 41. The frame 48 however permits free access to the front 42 and the back 43 of the phone 41. In this way, the keyboard 49 and the display 50 of the mobile phone 41 can be freely accessed. On one side of the frame 48 is an opening 51 covered with a flexible membrane (not shown). The opening 51 is arranged over the shutter button 52 of the mobile phone 41. The flexible membrane allows the shutter button 52 to be operated through the opening 51.

The frame 48 also has a second opening 53 which is aligned with the connection socket (not shown) in the bottom 45 of the phone 41. A plug 54 can be pressed through the second opening 53 in the frame 48 and into the connection socket in the bottom 45 of the phone. The phone 41 can therefore be held securely in the frame. The frame 48 and the plug 54 can be considered to be a type of attachment element for connecting the support elements to the mobile phone.

The side of the frame which is in contact with the top 44 of the phone could furthermore be provided with a surface which has a high friction in order to even better hold the mobile phone in place in the frame 48. The side of the frame could also be equipped with a spring biased part which is compressed when the phone is inserted into the frame. In this way, the phone is biased towards the side of the frame 38 which is in contact with the bottom 45 of the phone 41.

The stand 40 also comprises two support elements 55a, 55b. The support elements 55 are connected to the frame 48 via two hinges 56,57. The axis of the first hinge 56 is arranged along and parallel to the edge of the mobile phone between the front 42 and the left side 45 of the mobile phone. The axis of the second hinge 57 is arranged along and parallel to the edge of the mobile phone between the back 43 and the left side 45 of the mobile phone. As with the previous embodiments, the hinges 56,57 have a bit of friction which ensure that the support elements 55 maintain the position to which they are rotated by the user.

The support elements 55 are formed as thin sheet like elements which when in the storage position (FIG. 5) are rotated in towards the mobile phone 41 and lie up against the front 42 and the back 43 of the mobile phone 41. Due to the thin nature of the support elements 55, the entire stand in the storage position of the support elements 55 does not take up significantly more space than the mobile phone itself. In this way, the stand is easy to transport.

When the support elements 55 are rotated away from the mobile phone they assume their "active" position (FIG. 6). In this way, the stand 40 provides a steady support for the mobile phone and holds it in a steady orientation.

The edges of the frame 48 could also be equipped with sealing means (not shown), for example an o-ring gasket. A clip (not shown) could furthermore be arranged to securely clamp the support elements 55 towards each other and onto the attachment element in their storage position. In this way, the stand 40 could easily be made waterproof in the storage position of the support elements 55.

FIGS. 7-10 show a fourth embodiment 60 of a stand according to the current invention for a mobile telephone 61. The mobile phone 61 is identical to the mobile phone 41 of the previous embodiment 40 so it won't be described again. As with the previous embodiment 40, the stand 60 comprises a frame 62 which is arranged around the sides of the mobile phone 61. The frame 62 is connected to the mobile phone 61 in the same way as the frame 42 of the previous embodiment 40 was connected to the mobile phone 41 of the previous embodiment so it won't be described again.

The stand 60 also comprises a support element 63. The support element is formed as a thin sheet-like element which is formed such that it has a cross section which is approximately "C" shaped. Tracks 64a,64b are arranged along both edges of the support element 63. Pegs (not shown) arranged on tabs 65a,65b on the frame 62 connect with the tracks 64a,64b on both sides of the support element 63. The interface between the pegs and the tracks is of the form which allows the support element 63 to both slide along the tracks 64a,64b and rotate about the pegs. In this way, the support element 63 can easily be moved between different positions.

Figure 7:
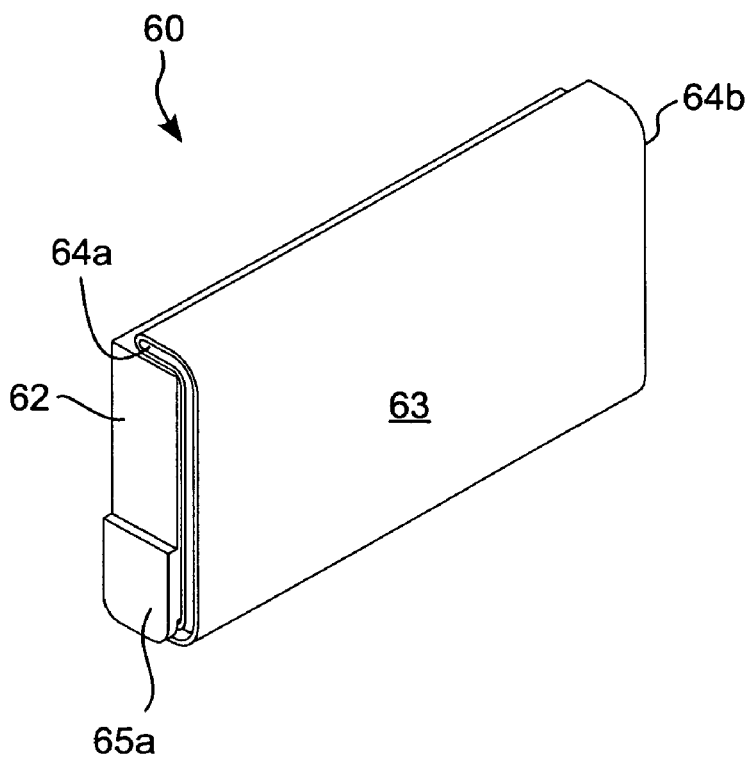
FIG. 7 shows a perspective view of a fourth embodiment of a stand according to the invention in a storage position.
Figure 8:
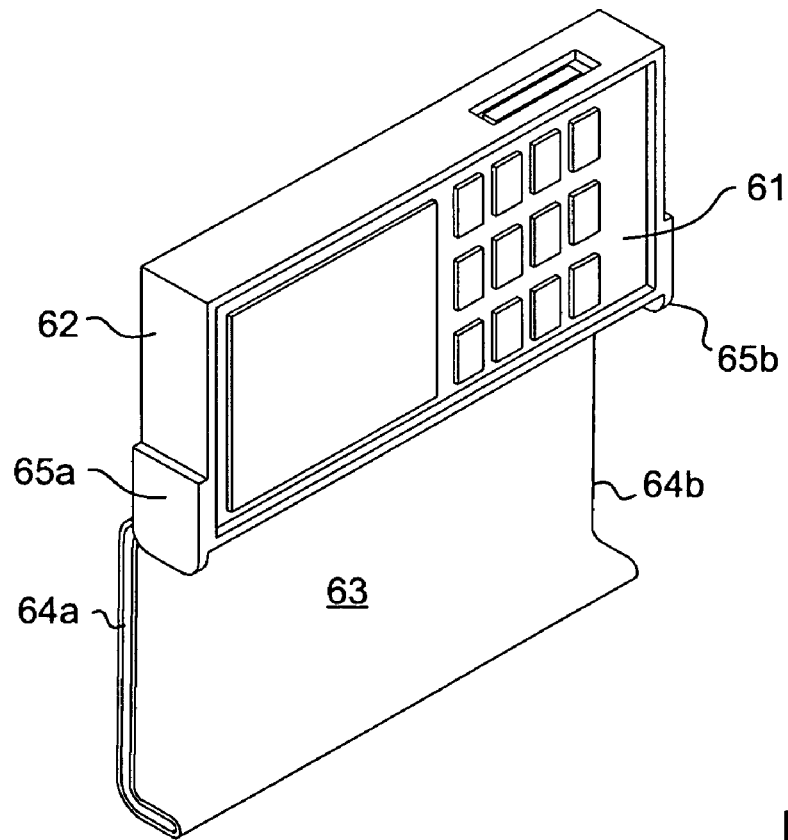
FIG. 8 shows a perspective view of the embodiment of FIG. 7 in a transition position between the storage position and an active position.

FIG. 7 shows the support element 63 in a "storage" position. In this position, the support element 63 lies up against the front of the mobile phone and protects the front of the mobile phone from damage. In FIG. 8, the support element 63 is in a transition position. In order to get into this position from the storage position of FIG. 7, the user has rotated the support element 63 away from the front of the mobile phone.

Figure 9:
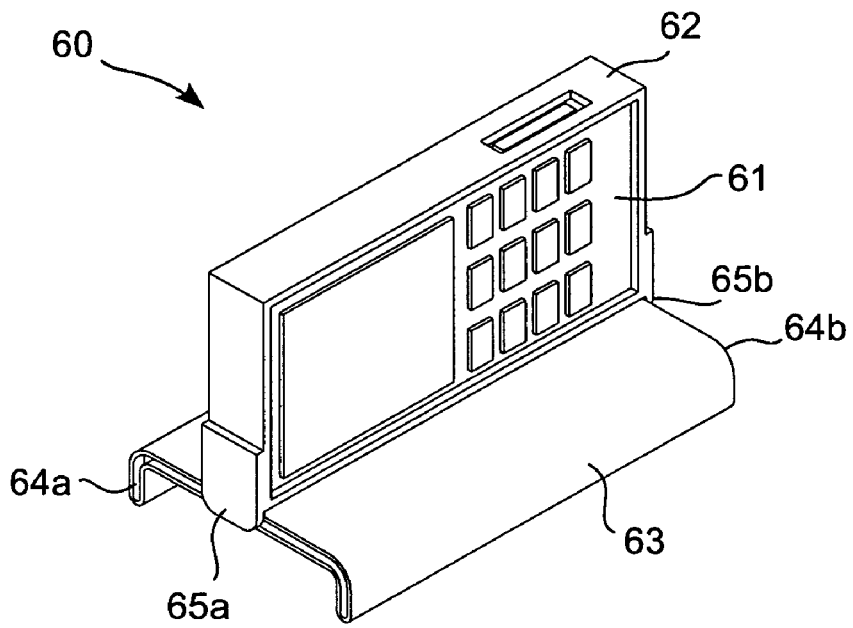
FIG. 9 shows a perspective view of the embodiment of FIG. 7 in an active position.
Figure 10:
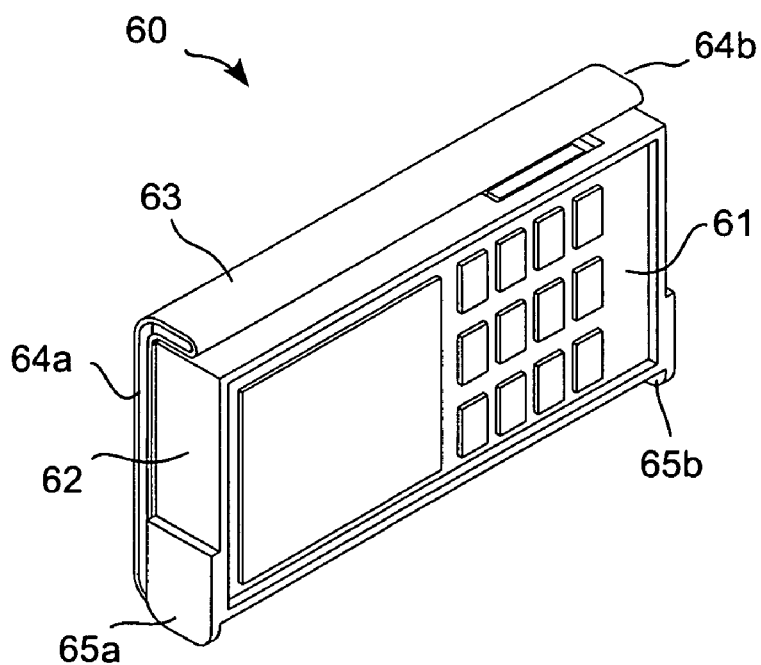
FIG. 10 shows a perspective view of the embodiment of FIG. 7 in a second storage position.

In FIG. 9 the support element 63 has been put into an "active" position. The From the position shown in FIG. 8, the user has first displaced the support element towards the right, then rotated the support element clockwise and the displaced the support element to the right again. In this "active" position, the support element 63 can be arranged on an underlying surface and thereby used to hold the mobile phone in a steady orientation on said underlying surface. In FIG. 10, the support element 63 has again been displaced along the track 64 and rotated about the pegs such that it now lies up against the back of the mobile phone. In this way, the keypad and display of the mobile phone are freely accessible.

It should be mentioned that the above four embodiments have all shown stands which are used together with mobile telephones. However, it should be obvious to person skilled in the art that similar stands could also be used for other forms of camera devices.

It should furthermore be noted that the above embodiments have shown four different examples of stands for camera devices. However, it should be obvious to the person skilled in the art that many other embodiments are also possible. For example, the four embodiments have all shown a case which is opened by rotating the support elements away from the front and/or back of the mobile phone. However, other embodiments where the support elements are rotated away from the sides of the mobile phone could also be imagined. For example the support elements could be rotated about an axis which is perpendicular to the front and/or rear of the phone. In another example, the embodiments described above have all been used with mobile phones which have a rectangular form. However, the teaching of the invention can also be used together with camera devices which are not of rectangular form.

What is claimed is:

1. A stand for a camera device, said stand comprising:
an attachment element which is detachably fastened to said camera device; and
at least one support element which is displaceably connected to said attachment element and which is displaceable between at least two positions, a storage position where said at least one support element essentially lies up against an outer surface of said camera device and an active position where said at least one support element is displaced away from said outer surface of said camera device in order to provide a support for supporting said camera device in a steady orientation on a surface, wherein said attachment clement and said supporting element are arranged such that the attachment element remains fastened to said camera device during the displacement of the supporting element between its storage position and its active position, wherein said attachment element forms a waterproof housing around the camera device that is maintained while the at least one support element is in the storage position and in the active position, and the attachment element comprises a flexible section through which a user can activate buttons of the camera device to take pictures through the waterproof housing of the attachment element.

2. A stand according to claim 1, wherein said at least one support element is formed such that in the storage position of said at least one support element, said at least one support element at least partially covers the camera device thereby protecting the camera device from damage.

3. A stand according to claim 1, wherein said at least one support element is a thin sheet like element.

4. A stand according to claim 1 wherein said stand comprises at least two support elements and that in said storage position, said at least two support elements completely cover the camera device.

5. A stand according to claim 1, wherein said stand further comprises an adjustment mechanism to adjust the orientation of the camera device in the active position of the at least one support element.

6. A stand according to claim 1, wherein said at least one support element is formed such that at least three support points are provided between the support element and the underlying surface when the at least one support element is in its active position.

7. A stand according to claim 1, wherein said at least one support element is rotatably attached to the attachment element via at least one hinge and in that the axis of said at least one hinge is parallel or tangent to at least one of the sides of the camera device.

8. A stand according to claim 1, wherein said stand comprises at least two support elements and that in the storage position of said at least two support elements, one of said at least two support elements covers at least a portion of the front of the camera device and the other of said at least two support elements covers at least a portion of the back of the camera device.

9. A stand according to claim 1, wherein the attachment element attaches to the camera device by applying clamping onto two opposing sides.

10. A stand according to claim 1, wherein the stand further comprises at least one other accessory.

11. A stand according to claim 1, wherein the attachment element attaches to an interface socket of the camera device.

12. A stand according to claim 1, wherein the camera device is a mobile telephone with a built-in camera.

13. A stand according to claim 1, wherein the camera device is a camera and that the attachment element attaches to a tripod attachment nut in the housing of the camera.

14. A stand for a camera device, said stand comprising:
an attachment element having first and second housing portions that are configured to releasable engage one another to form a waterproof housing enclosing said camera device, wherein said attachment element comprises a flexible section through which a user can activate buttons of the camera device; and
at least one support element that is rotatably connected to the attachment element and movable between a storage position, where said at least one support element essentially lies up against an outer surface of the attachment element, and an active position, where said at least one support element is displaced away from said outer surface of said attachment element and forms a support that supports said camera device in a steady orientation on a surface and while the attachment element maintains a waterproof seal around the camera.

* * * * *